United States Patent
Lin et al.

(10) Patent No.: US 8,108,071 B2
(45) Date of Patent: Jan. 31, 2012

(54) METHOD FOR COORDINATING COOPERATIVE ROBOTS

(75) Inventors: Yen-Chun Lin, Taipei (TW); Jen-Hua Wu, Hsinchu (TW); Kuo-Tsung Tseng, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 1059 days.

(21) Appl. No.: 11/970,520

(22) Filed: Jan. 8, 2008

(65) Prior Publication Data
US 2009/0015404 A1    Jan. 15, 2009

(30) Foreign Application Priority Data
Jul. 13, 2007    (TW) ................................. 96125624 A

(51) Int. Cl.
*G05B 19/418* (2006.01)

(52) U.S. Cl. ........ 700/248; 700/245; 700/246; 700/250; 700/264; 318/568.11; 318/587; 318/567; 318/569

(58) Field of Classification Search .......... 700/245–246, 700/249–250, 253; 318/568.11, 568.13; 901/1, 6, 46
See application file for complete search history.

(56) References Cited

U.S. PATENT DOCUMENTS

| | | | |
|---|---|---|---|
| 5,819,008 A | 10/1998 | Asama et al. | |
| 6,266,577 B1 * | 7/2001 | Popp et al. | 700/248 |
| 6,408,226 B1 | 6/2002 | Byrne et al. | |
| 6,438,456 B1 | 8/2002 | Feddema et al. | |
| 6,687,571 B1 | 2/2004 | Byrne et al. | |
| 7,030,757 B2 | 4/2006 | Matsuhira et al. | |
| 7,165,106 B2 * | 1/2007 | Matsumura et al. | 709/224 |
| 2005/0113974 A1 | 5/2005 | Doi | |

FOREIGN PATENT DOCUMENTS
JP    2003051082    2/2003
* cited by examiner

*Primary Examiner* — Thomas Black
*Assistant Examiner* — Luke Huynh
(74) *Attorney, Agent, or Firm* — Jianq Chyun IP Office

(57) ABSTRACT

A method for coordinating cooperative robots is provided. The method includes following steps. An abnormal event is detected by a sensor disposed in an environment or in a robot. The abnormal event is broadcasted to the cooperative robots. Each robot determines whether the priority of the abnormal event is higher than that of its currently executing task. If the answer is "yes," whether function attributes of the robot meet attributes of the abnormal event is then determined. If the function attributes of the cooperative robot do not meet the attributes of the abnormal event, the robot broadcasts to acquire help from other robots, thereby constituting an instantly designated task team. The instantly designated task team goes to where the abnormal event takes place to process the abnormal event. After the abnormal event has been eliminated, the instantly designated task team is dismissed and these robots resume their original tasks.

17 Claims, 3 Drawing Sheets

METHOD FOR COORDINATING COOPERATIVE ROBOTS

CROSS-REFERENCE TO RELATED APPLICATION

This application claims the priority benefit of Taiwan application serial no. 96125624, filed on Jul. 13, 2007. The entirety of the above-mentioned patent application is hereby incorporated by reference herein and made a part of this specification.

BACKGROUND OF THE INVENTION

1. Field of the Invention

The present invention generally relates to a robot used in a security system, in particular, to a method for coordinating cooperative robots so as to expand a detected range of abnormal events and effectively eliminate abnormal situations in an environment.

2. Description of Related Art

With the advancement of technology and improvement in the quality of our life, the safety of our living environment, such as houses, office buildings, laboratories, factories, financial institutions, and other public places, has become one of main concerned issues. Accordingly, in recent years, various industries have been focusing on developing different security systems, and security service provision has become a fast-developing field. However, an existing commercialized security system has not sufficient mobility and intelligence for detecting different situations, so that a mistaken triggered rate/false alarm rate thereof is very high, which not only causes users to be confused but reduces the reliability of the security system as well. Moreover, security patrol is the most disfavored job for many security staffs, and owing to uncontrollable (physical and mental) factors of human, security routines cannot be fully carried out even imposed with complete regulations. Due to the rapid development of robots in recent years, replacing security staffs with mobile robots (referred as robots thereinafter) to carry out security patrol is made possible.

A single patrol robot is disclosed in Japan Pub. No. 2003051082. The patrol robot includes a control system and a plurality of sensors, such as video, audio, heat, temperature, and gas sensors for monitoring the surrounding environment. When the sensor detects the occurrence of an abnormal event, the sensor sends a message to the robot so that the robot goes to where the abnormal event takes place to collect information. The situation is then evaluated by the control system of the robot according to the collected information and is then processed according to the evaluated result. However, since there is only one robot for monitoring the environment, when the area to be monitored is too large and the communication of the robot is obstructed, the robot may not be able to collect the information of the abnormal event in a short time. Besides, if any malfunction occurs in the robot itself, the entire security system will be invalidated. Moreover, in most cases, the abnormal events, such as a moving intruder, fire, or gas, may spread to many different places; thus, the single robot cannot go to all these places to collect information at one time when more than one sensor detect the abnormal events.

A task takeover mechanism in a cooperative robot system is disclosed in U.S. Pub. No. US20050113974, wherein both a pet robot and a security robot are disposed in a particular environment, and when an event takes place in this particular environment, for example, a house owner comes back, the task is handed over from the security robot to the pet robot so that the pet robot can perform related housework; contrarily, if the house owner leaves the house, the pet robot hands over the task to the security robot so that the security robot can carry out security-related works. In addition to being triggered by occurrences of events, the task handover may also be triggered by the location information of the robots. Taking robots disposed at different floors as an example, when a robot at a particular floor leads a guest to a staircase, the robot detects a location mark of the staircase such that it communicates with a robot at another floor and hands over the reception task to the other robot. However, in the task handover mechanism described above, the task can only be handed over from one particular robot to another particular robot, while the task is still executed by only one robot. In other words, in foregoing two inventions, since elimination of an abnormal event (such as fire) is carried out by only a single robot, the abnormal event cannot be eliminated effectively.

Accordingly, there exists a need for providing a method for coordinating cooperative robots (or referred as multiple robots) to carry out the same task effectively.

SUMMARY OF THE INVENTION

Accordingly, the present invention is directed to a method for coordinating cooperative robots. The method includes following steps. First, an abnormal event is detected by a sensor disposed in an environment or in a robot. Then, the abnormal event is broadcasted to a plurality of cooperative robots. Next, each robot determines whether the priority of the abnormal event is higher than that of its currently executing task. If the answer is "yes," then whether function attributes of the robot meet attributes of the abnormal event is determined. If the function attributes of the robot does not meet the attributes of the abnormal event, the robot broadcasts to acquire help from other robots and constitute an instantly designated task team, and the instantly designated task team goes to where the abnormal event takes place to process and eliminate the abnormal event. Finally, after the abnormal event has been eliminated, the instantly designated task team is dismissed and these cooperative robots resume their original tasks.

The present invention is directed to a method for avoiding task conflict among cooperative robots. The method includes following steps. First, an abnormal event is detected by a sensor. Then, the abnormal event is broadcasted to a plurality of cooperative robots. When a first robot determines that the priority of a task being currently executed is equal to the priority of the abnormal event, the first robot increases weight of the abnormal event and issues a broadcast message of the weighted abnormal event. After that, the first robot continues to execute its task, and a second robot receives the weighted broadcast message. Next, the second robot calcuates the priority to determine which of the abnormal event and its currently executing task has higher priority. If the priority of the abnormal event is higher, the second robot goes to where the abnormal event takes place to process the abnormal event; otherwise, if the task being currently executed by the second robot is higher, the second robot increases the weight of the weighted abnormal event and issues a broadcast message of the twice-weighted abnormal event. Foregoing process will be repeated until a particular robot goes to process the abnormal event.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
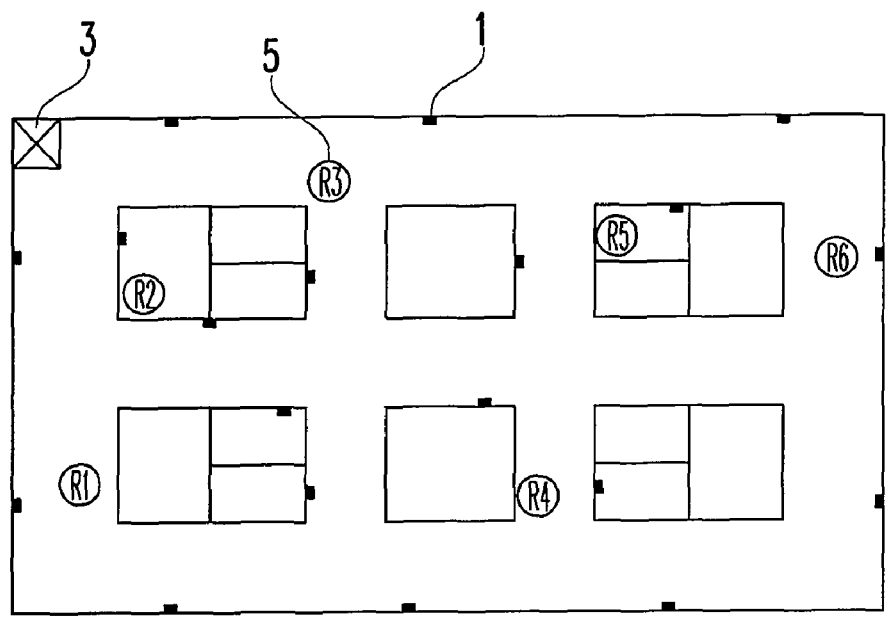
FIG. 1 is a layout diagram of a plurality of cooperative robots which are executing a task according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a layout diagram of a plurality of cooperative robots which are executing a task according to an embodiment of the present invention. Referring to FIG. 1, a plurality of sensors 1, a main system 3 (optionally disposed), and a plurality of mobile robots (referred as robots thereinafter) 5 (R1-R6) are illustrated. The sensors 1 may be sensors having different functions used in a security system, such as image sensors, fire sensors, smoke sensors, infrared ray sensors, movement sensors, vibration sensors, gas sensors, human figure sensors, or the combinations thereof. The sensors 1 can be disposed at different locations in the surrounding environment or in the robots 5 for detecting an abnormal event in the environment and broadcasting the abnormal event to the robots 5. Besides, the abnormal event may also be broadcasted to the robots 5 through the main system 3. For the convenience of description, the term "abnormal event" will be referred as "event" in following description.

Figure 2:
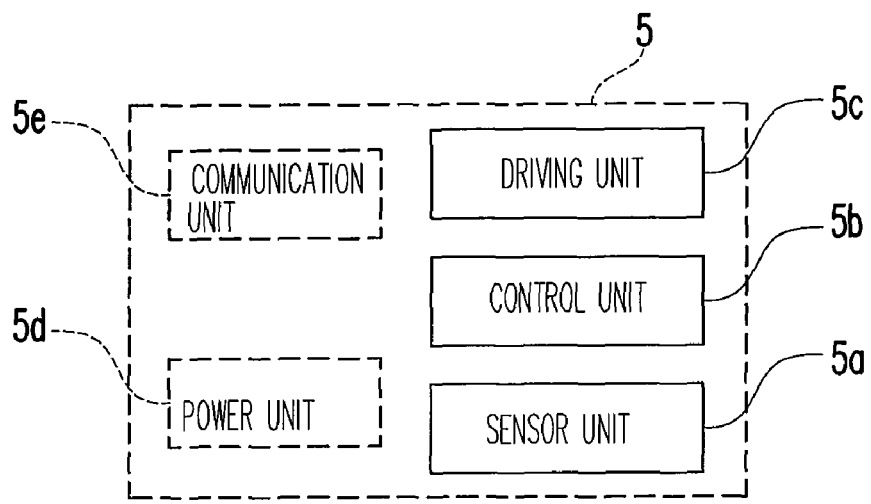
FIG. 2 is an internal structure diagram of a robot according to an embodiment of the present invention.

The robots 5 can move along predetermined routes in the environment or can be self-navigated. As illustrated in FIG. 2, each of the robots 5 includes a sensing unit 5a, a control unit 5b, a driving unit 5c, a power unit 5d, and a communication unit 5e, wherein the sensor unit 5c further includes a sensor 1. Each robot receives signals from the main system 3 or from other robots through the communication unit 5e and then make decisions through the control unit 5b according to certain programs. Thus, the robots 5 can be coordinated to execute multiple tasks. Each robot can perform self-navigated patrol, such as positioning, navigating, route planning, obstacle avoiding, and environment sensing.

The method for coordinating cooperative robots includes setting up an instantly designated task team and avoiding system conflict. Regarding setting up an instantly designated task team, when a robot which is executing self-navigated patrol, receives a task assigned by the main system or detects an event taking place in the environment, the robot acquires help from other robots which have the same task attributes or are in short distances based on an actual situation in order to, for example, put out a fire or stop a gangster together. When the task is completed, the instantly designated task team is then dismissed and each robot returns to its original status of self-navigated patrol. Regarding avoiding system conflict, the execution of the cooperative robots are distributed in time, space, and functions when they cooperate with one other so that various security tasks can be carried out at different places at the same time. However, a conflict between time, space, or task may happen. For example, a robot is temporarily assigned with a task while it is executing another task. Any conflict may seriously affect the performance of the entire security system. In the present invention, when a system conflict occurs, those related robots can instantly broadcast the conflict so that each of other robots can, according to its operation status, determine whether to accept the request of the robot or relegate the task to another robot.

Figure 3:
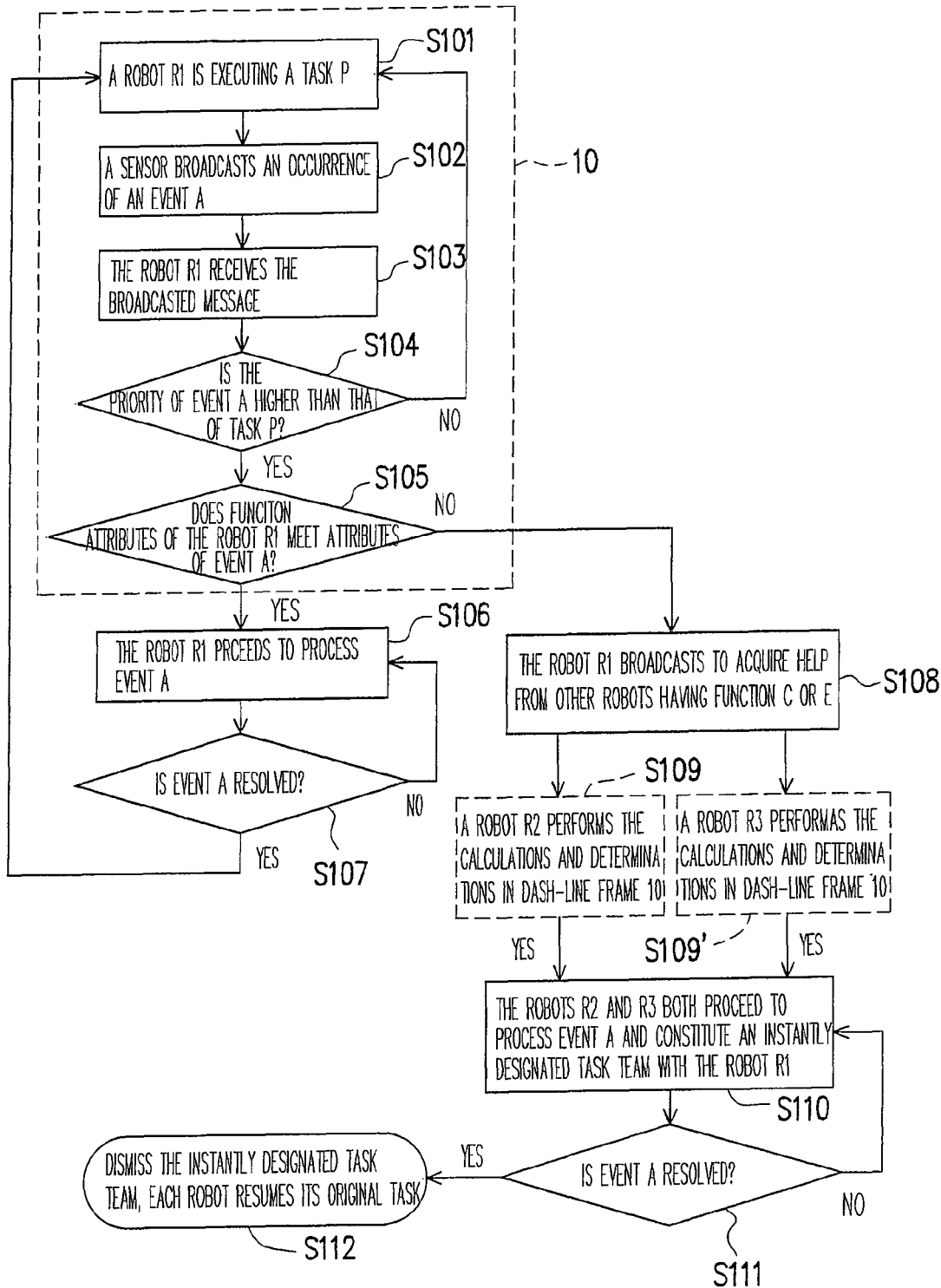
FIG. 3 is a flowchart of constituting an instantly designated task team of cooperative robots according to an embodiment of the present invention.

In the following, an embodiment of constituting an instantly designated task team of cooperative robots will be described in detail. FIG. 3 is a flowchart of constituting an instantly designated task team of cooperative robots according to an embodiment of the present invention. Referring to FIG. 3, a dash-line frame 10 comprises steps S101~S105. In step S103, when a robot R1 is executing a task P (step S101), the robot R1 receives a message broadcasted by a sensor indicating an occurrence of an event A, for example, "fire setting by an intruder", is detected (step S102). Next, in step S104, the robot R1 determines whether the priority of the event A is higher than that of the task P and then executes the one having higher priority first. If the priority of the event A is higher than that of the task P, in step S105, the robot R1 determines whether function attributes thereof meet attributes of the event A. If the function attributes of robot R1 do not meet the attributes of the event A, the robot R1 returns to step S101 to resume its original task. To facilitate calculation performed by the control unit 5b in each robot, and its decision based on the calculated result, all the functions of the robot, events, and tasks are represented with attribute vectors. For example, the function attribute vector F1 of the robot R1 has six parameters, namely, F1=(a,b,0,d,0,z). However, in other embodiments of the present invention, the function attribute vector of the robot R1 is not limited to these six parameters; instead, the function attribute vector of the robot R1 can consist of n parameters, namely, F1=(1, 2 . . . , n), wherein n is an integer greater than 1. Each parameter represents a different function, and the function can be set by a manufacturer of the robot. Taking the foregoing event A of "fire setting by an intruder" as an example, to resolve the event A, the parameters a, b, c, and e can be respectively set to "put out fire", "vent smoke", "track", and "stop".

How to determine the order of the priorities according to the attribute vectors and whether the function attributes of the robot R1 meet the attributes of the event A will be explained herein. Calculations of the priorities of the task P and the event A are disclosed in table 1.

TABLE 1

| | Function attribute vector of robot R1 F1 = (a,b,0,d,0,z) | | | | |
|---|---|---|---|---|---|
| | Attribute vector of task/event | Weight of task/event | Distance | Dot product of function and attribute | Weighted priority |
| Task P | K1 = (0,0,0,0,0,z) | W1 | D1 | F1 · K1 | $P1 = W1 \dfrac{F1 \cdot K1}{D1}$ |
| Event A | K2 = (a,b,c,0,e,0) | W2 | D2 | F1 · K2 | $P2 = W2 \dfrac{F2 \cdot K2}{D2}$ |

As shown in table 1, the function attributes of the robot R1 are described as vector F1=(a,b,0,d,0,z), which means the robot R1 has functions a, b, d, and z, wherein it is assumed that a=26, b=25, d=23, z=1. The attribute vector of the task P is K1=(0,0,0,0,0,z), and the attribute vector of the event A is K2=(a,b,c,0,e,0). When the robot R1 receives a broadcast message, the robot R1 calculates a weighted priority according to the function attribute F1 thereof, the attribute K1 of the task being currently executed, the attribute K2 of the event, the weight W1 of the task being current executed, the weight W2 of the event, and a distance D2 between the robot R1 and where the event takes place (or a distance D1 between the robot R1 and where the task is currently executed), wherein W1=1, W2=4, D1=2, and D2=7. In step S104, the robot R1 determines whether the priority of the event A is higher than that of task P, and through calculation, the priority of the task P is obtained as P1=w1(F1·K1)/D1=½, and the priority of the event A is obtained as P2=w2(F2·K2)/D1=4(26²+25²)/7≈743.4. Accordingly, the priority of the event A (or task P) is directly proportional to the dot product of the attribute vector thereof and the function attribute vector of the robot R1. Thus, the result is obtained as P2>P1, and accordingly the robot R1 processes the event A first. Taking the event A of "fire setting by an intruder" as an example, the procession of the event A means that the event A is eliminated after by the "fire" is put out and the "intruder" is deterred by the robot R1.

Next, the robot R1 determines whether the function attribute thereof meets the attribute of the event A by subtracting the function attribute vector of robot R1 from the attribute vector of the event A, namely, K2−F1=(a,b,c,0,e,0)−(a,b,0,d,0,z)=(0,0,c,−d,e,−z)=(0,0,24,−23,22,−1), wherein the third and the fifth function are still respectively 24 and 22, which means the function requirement of c and e of event A cannot be met by the robot R1, therefore the function attribute of the robot R1 cannot meet the attribute of the event A. Since the event A cannot be processed because the robot R1 cannot provide functions c and e, then in step S108, the event A is broadcasted to acquire help from other robots having functions c or e. In steps 109 and 109', after receiving the broadcasted request of the robot R1, the robot R2 (having function attribute c), the robot R3 (having function attribute e), or other robots perform the calculation and determination steps in the dash-line frame 10 to determine whether to accept the request and help to process the event A. When the robots R2 and R3 both determine to accept the broadcasted request of the robot R1, they go to where the robot R1 is and constitute an instantly designated task team with the robot R1, as in step S110. After that, in step S111, whether the event A has been resolved is determined. If the event A has been resolved, step S112 is executed to dismiss the instantly designated task team so that the three robots R1, R2, and R3 respectively resume their original task. If the event A is still not resolved, step 110 is repeated until the event A is resolved.

However, if the robot R1 has all the functions required by the event A, for example, F1=(a,b,c,d,e,z) and then K2−F1=(0,0,0,−d,0,−z), and all the function parameters are smaller than or equal to 0, the robot R1 can process the event A by itself. Accordingly, in step S106, the robot R1 goes to where the event A takes place and then processes it. In step S107, if the event A is resolved, the robot R1 returns to step S101 to resume its original task P; otherwise, the robot R1 repeats step S106 until the event A is resolved.

Certainly, in step S102, the event A, for example, "fire setting by an intruder", may be transmitted to the main system 3 through the sensor 1 as illustrated in FIG. 1 and then broadcasted to the robots by the main system 3, wherein the event may be transmitted to the main system through cable transmission or wireless transmission.

Figure 4:
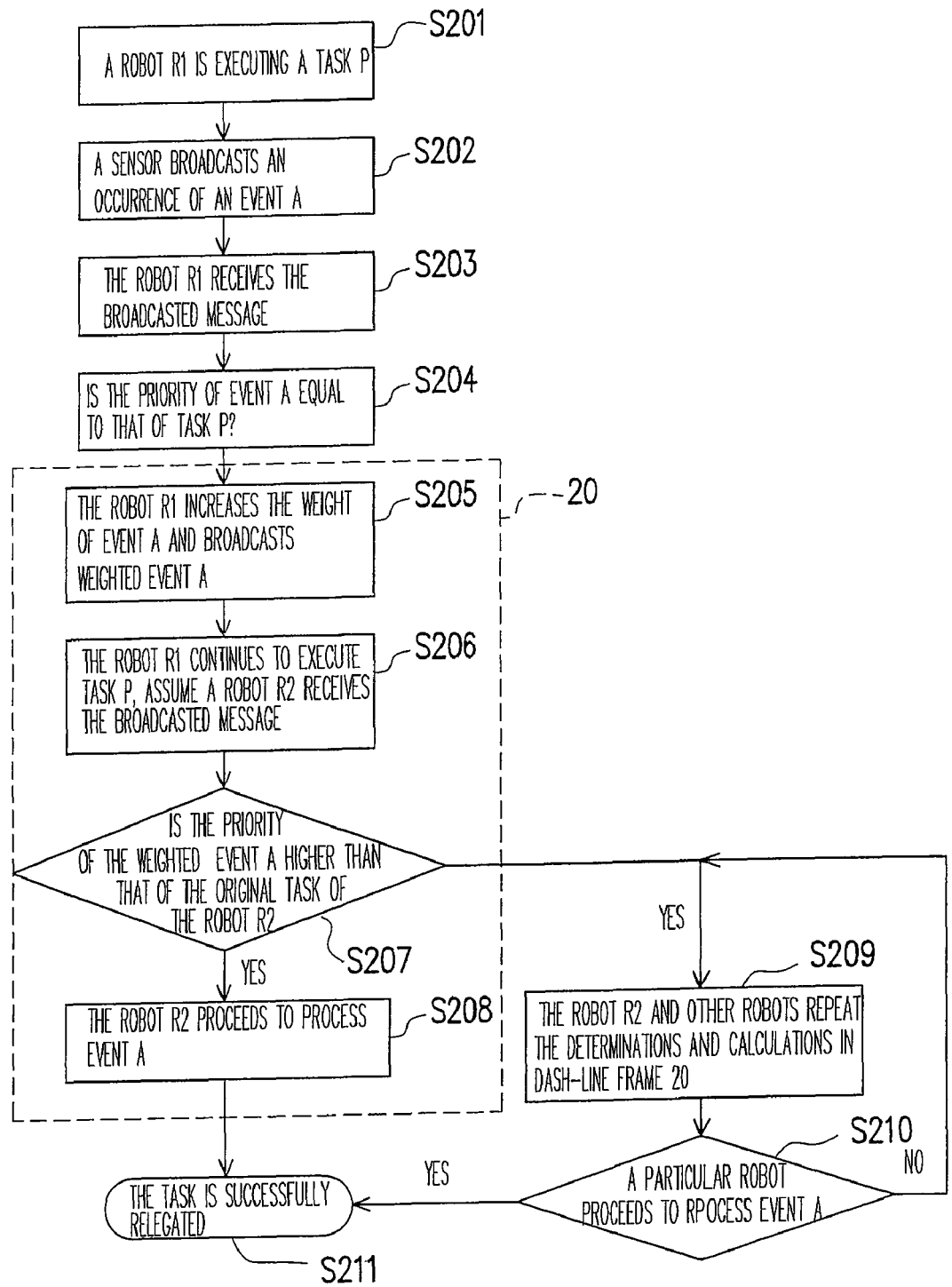
FIG. 4 is a flowchart of avoiding task conflict among cooperative robots according to an embodiment of the present invention.

FIG. 4 is a flowchart of avoiding task conflict among cooperative robots according to an embodiment of the present invention. Still taking the robot R1 as example, in steps S201, 202, 203, the robot R1 receives a message broadcasted by a sensor indicating the event A, i.e. "fire setting by an intruder", is detected when the robot R1 is executing the task P. Next, in step S204, the robot R1 determines that the priority of the task P is equal to the priority of the event A. In other words, for the robot R1, event A and task P conflict with each other. Then, the robot R1 executes step S205 to increase the weight W2 of the event A and issues a broadcast message of the weighted event A in order to relegate the task. After that, in step S206, the robot R1 continues to execute the original task P and it is assumed that the robot R2 receives the broadcase message of the weighted event A. Here a task conflict of the robot R1 is already resolved. Thereafter, in step S207, the robot R2 receives the broadcast message of the weighted event A issued by the robot R1 (here the weight W2 is increased for one time) and calculates the priorities in order to determine whether the priority of the weighted event A is higher than that of the task being currently executed by the robot R2. If the priority of the weighted event A is higher, step S208 is executed, wherein the robot R2 goes to where the event A takes place and then process it, which means the robot R1 has successfully relegate the task to the robot R2, as in step S211. Otherwise, in step S207, if the priority of the original task P of the robot R2 is higher, step S209 is executed, wherein the robot R2 and other robots repeat the determination and operation steps in a dash-line frame 20 (including steps S205-S208). In other words, the robot R2 also increases the weight of the weighted event A, which is referred to as "twice-weighted event A," (please note that the weight has been increased twice) and broadcasts a message of the twice-weighted event A to relegate the task to another robot. Next, in step S210, whether a particular robot has proceeded to process event A is determined. If so, step S211 is executed, which means the robot R2 has successfully relegate the task; otherwise, another robot repeats the determination steps as the robot R2 does (i.e. repeating of the step S209) until the task is successfully relegated, namely, a particular robot proceeds to where the event A takes place to process the event A.

In overview, the method for coordinating cooperative robots provided by the present invention has at least following advantages:

1. Through information sharing, constitution of an instantly designated task team, and conflict avoidance, a particular task can be completed by a plurality of cooperative robots, and even a malfunction occurs to one of the cooperative robots or task conflict is confronted during the process, other cooperative robots can help to complete the task, so that the task can be completed effectively.

2. Compared with the conventional robot which is disposed with many different sensor systems, the robot in the present invention has simpler system function and accordingly lower cost. Meanwhile, in the present invention, a plurality of robots can be disposed so that a monitored range in the present invention is larger than that in the conventional technique.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for coordinating a plurality of cooperative robots, comprising:
   detecting an abnormal event through a sensor;
   broadcasting the abnormal event to the cooperative robots;
   determining whether a priority of the abnormal event is higher than a priority of the task being currently executed by the robot, wherein if the priority of the abnormal event is higher than the priority of the task being currently executed by the robot, whether function attributes of the robot meet attributes of the abnormal event is then determined, and if the function attributes of the robot do not meet the attributes of the abnormal event, the robot broadcasts to acquire help from other robots to constitute an instantly designated task team, and the instantly designated task team goes to where the abnormal event takes place to process and eliminate the abnormal event; and
   dismissing the instantly designated task team and resuming the original tasks of the robots after the abnormal event has been eliminated;
   wherein the priority of the abnormal event is calculated according to a dot product of an attribute vector of the abnormal event and a function attribute vector of each robot, the weight of the abnormal event, and a distance between each robot and where the abnormal event takes place, and the priority of the task being currently executed is calculated according to a dot product of an attribute vector of the task being currently executed and the function attribute vector of each robot, the weight of the task, and a distance between each robot and where the task is currently executed.

2. The method according to claim 1, wherein the attribute vector of the abnormal event, the attribute vector of the robot, and the attribute vector of the task being currently executed are respectively represented by a vector (1, 2 . . . , n) consisting of n parameters, wherein n is an integer greater than 1 and each of the n parameters represents a different function.

3. The method according to claim 2, wherein the step of whether the function attributes of each robot meet the attributes of the abnormal event, is determined by subtracting the function attribute vector of the robot from the attribute vector of the abnormal event, wherein if the parameters corresponding to the abnormal event in the subtraction result are all 0 or negative, it is determined that the function attributes of the robot meet the attributes of the abnormal event; otherwise, it is determined that the function attributes of the robot does not meet the attributes of the abnormal event.

4. The method according to claim 1, wherein in the step of broadcasting the abnormal event to the robots, the abnormal event is first transmitted to a main system and then transmitted to the robots by the main system.

5. The method according to claim 1, wherein the sensor may be a plurality of different sensors disposed in a particular environment.

6. The method according to claim 1, wherein the sensor is disposed in each of the robots.

7. The method according to claim 5, wherein the different sensors comprise image sensors, fire sensors, smoke sensors, infrared ray sensors, movement sensors, vibration sensors, temperature sensors, gas sensors, human figure sensors or a combination thereof.

8. The method according to claim 4, wherein the abnormal event is transmitted to the main system through one of cable transmission and wireless transmission.

9. The method according to claim 1, wherein the robot broadcasts to acquire help from other robots through a control unit and a communication unit disposed in the robot.

10. A method for avoiding task conflict among a plurality of cooperative robots, comprising:
    detecting an abnormal event through a sensor;
    broadcasting the abnormal event to the cooperative robots;
    increasing the weight of the abnormal event and issuing a broadcast message of the weighted abnormal event through a first robot when the first robot determines that a priority of a task being currently executed by the first robot is equal to a priority of the abnormal event;
    continuing to execute the task being currently executed through the first robot and receiving the weighted broadcast message of the abnormal event through a second robot;
    determining whether the priority of the weighted abnormal event is higher than a priority of a task being currently executed by the second robot through the second robot, wherein if the priority of the weighted abnormal event is higher than the prioirity of the task being currently executed by the second robot, the second robot goes to where the abnormal event takes place and then process the abnormal event; otherwise, if the priority of the task being currently executed by the second robot is higher than the priority of the weighted abnormal event, the second robot increases the weight of the weighted abnormal event and issues a broadcast message of the twice-weighted abnormal event; and repeating foregoing steps until a particular robot goes to process the abnormal event;
    wherein the priority of the abnormal event is calculated according to a dot product of an attribute vector of the abnormal event and a function attribute vector of each robot, the weight of the abnormal event, and a distance between each robot and where the abnormal event takes place, and the priority of the task being currently executed is calculated according to a dot product of an attribute vector of the task being currently executed and the function attribute vector of each robot, the weight of the task, and a distance between each robot and where the task is currently executed.

11. The method according to claim 10, wherein the attribute vector of the abnormal event, the function attribute vector of the robot, and the attribute vector of the task being currently executed are respectively represented by a vector (1, 2 . . . , n) consisting of n parameters, wherein n is an integer greater than 1 and each of the n parameters represents a different function.

12. The method according to claim 10, wherein in the step of broadcasting the abnormal event to the robots, the abnormal event is first transmitted to a main system and then transmitted to the robots by the main system.

13. The method according to claim 10, wherein the sensor may be a plurality of different sensors disposed in a particular environment.

14. The method according to claim 10, wherein the sensor is disposed in each of the robots.

15. The method according to claim 10, wherein the different sensors comprise image sensors, fire sensors, smoke sensors, infrared ray sensors, movement sensors, vibration sensors, temperature sensors, gas sensors, human figure sensors or a combination thereof.

16. The method according to claim 12, wherein the abnormal event is transmitted to the main system through one of cable transmission and wireless transmission.

17. The method according to claim 10, wherein the step of robot's broadcasting to acquire help from other robots, is achieved through a control unit and a communication unit disposed in the robot.

* * * * *